United States Patent [19]
Tippmann et al.

[11] Patent Number: 6,062,129
[45] Date of Patent: *May 16, 2000

[54] STEAM HEATED GRIDDLE AND GRILL

[76] Inventors: Joseph R. Tippmann, HRC-33, Box 8419, Rapid City, S. Dak. 57701; Vincent P. Tippmann, 8605 N. River Rd., New Haven, Ind. 46774

[ * ] Notice: This patent issued on a continued prosecution application filed under 37 CFR 1.53(d), and is subject to the twenty year patent term provisions of 35 U.S.C. 154(a)(2).

[21] Appl. No.: 08/963,248

[22] Filed: Nov. 3, 1997

[51] Int. Cl.⁷ .............................. A47J 37/00; A47J 37/06
[52] U.S. Cl. ................................. 99/330; 99/339; 99/340; 99/417; 99/422; 99/448; 99/450; 126/25 R; 126/369; 219/401
[58] Field of Search .............................. 99/330, 339, 340, 99/345–347, 349, 352–355, 357, 403, 372–379, 410, 413, 416, 417, 426, 422, 447–450, 484, 516, 517; 126/9 R, 20, 25 R, 29, 152 B, 369, 374–378, 389, 390; 165/104.21, 104.26; 219/524, 525, 386, 401

[56] References Cited

U.S. PATENT DOCUMENTS

| | | | |
|---|---|---|---|
| 4,913,039 | 4/1990 | Sutphen | 99/339 |
| 5,033,366 | 7/1991 | Sullivan | 99/352 |
| 5,086,693 | 2/1992 | Tippmann et al. | 99/333 |
| 5,189,945 | 3/1993 | Hennick | 99/339 |
| 5,201,364 | 4/1993 | Tippmann et al. | 219/386 X |
| 5,203,258 | 4/1993 | Tippmann et al. | 99/483 |
| 5,247,874 | 9/1993 | George, II et al. | 99/330 |
| 5,682,809 | 11/1997 | Harrison | 99/339 |

*Primary Examiner*—Timothy F. Simone
*Attorney, Agent, or Firm*—Griffin, Butler Whisenhunt & Szipl, LLP

[57] ABSTRACT

A griddle is disclosed having a base with a surface for cooking food items that is heated by pressurized steam circulated through a passageway in the base from a temperature controlled boiler. Steam injected beneath a cover adapted to be placed over the food items cooking on the heated surface can greatly decrease the required cooking time for the food item. A grill heated by the same pressurized steam is also disclosed with a similar cover and steam injection feature.

20 Claims, 4 Drawing Sheets

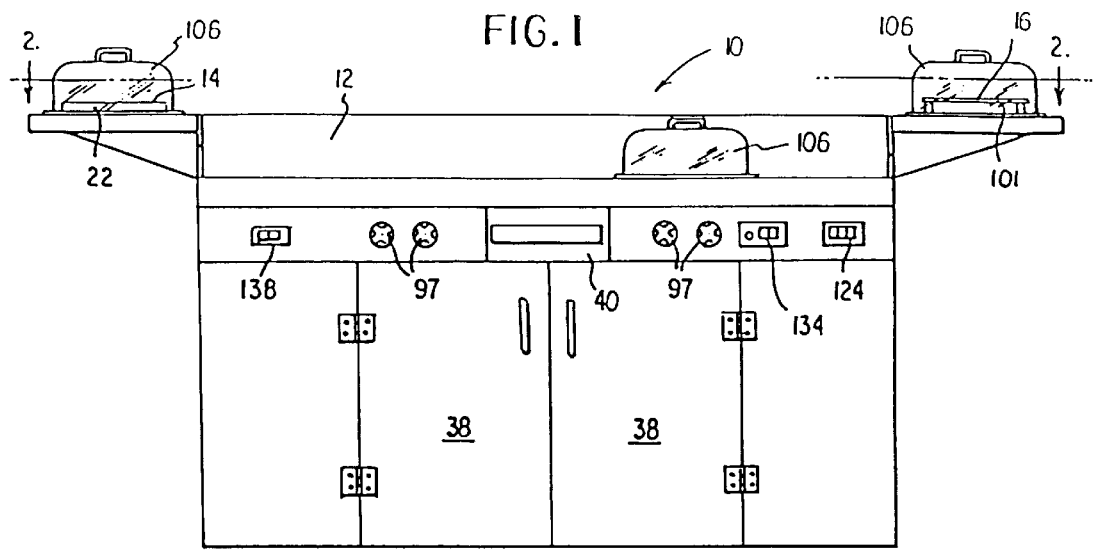
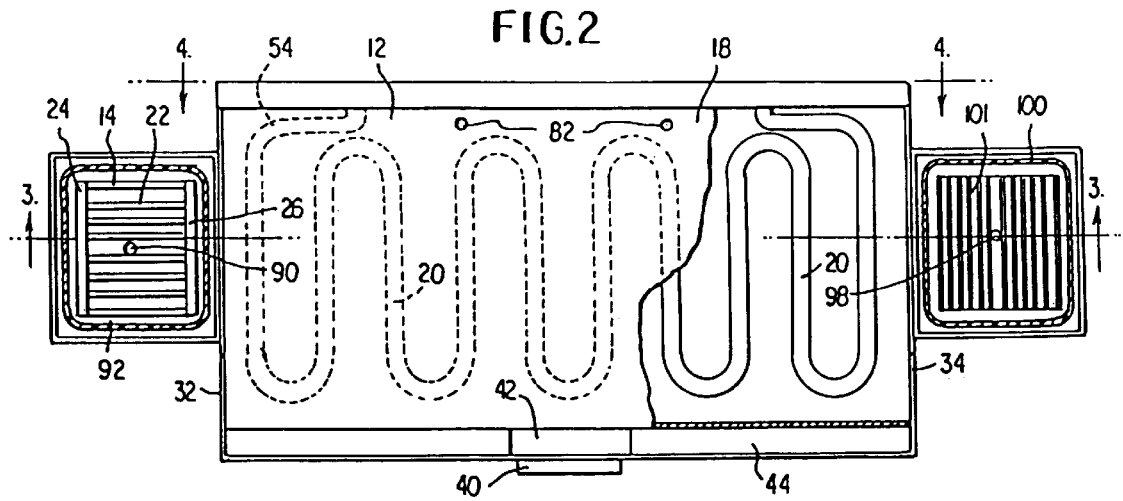
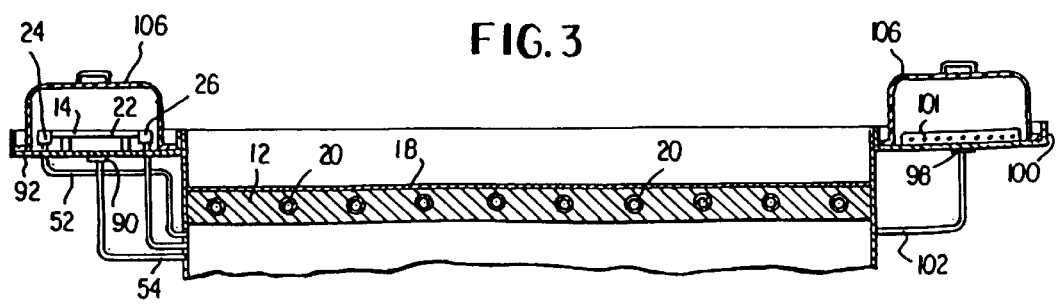

6,062,129

STEAM HEATED GRIDDLE AND GRILL

This invention relates to both a griddle and a grill for cooking food items and, more specifically, to a steam heated griddle and grill cooking surface and a cover adapted to be placed over selected food items cooking thereon to also simultaneously cook them by steam introduced into the interior of the cover.

BACKGROUND OF THE INVENTION

The cooking of items by placing them on a grilling surface and simultaneously introducing steam into the interior of a hood covering food items being grilled is known as disclosed in U.S. Pat. No. 4,913,039. The grill disclosed in that patent is unevenly heated by either burning charcoal or lava rocks heated by an electric heating element or a gas flame in contrast to applicants' grilling surface which is evenly heated by a source of pressurized steam whose temperature is accurately controlled.

SUMMARY OF THE INVENTION

Applicants have discovered that utilizing steam at a relatively high temperature and pressure to heat griddle-type cooking surfaces results in a surface that is the same temperature across its entire area within one or two degrees Fahrenheit in contrast to conventional griddles that can have a temperature variation as much as 70–80 degrees from area to another. The griddle of the present invention is made of approximately one inch thick aluminum which is cast around a serpentine pipe for carrying the steam. The cooking surface of the riddle, because it is maintained at an even, low temperature, can be provided with various stick resistant coatings or could be plated with different metals such as nickel. Such a stick resistant surface ensures that most of the desirable browning will remain on the food upon its removal from the griddle's surface. Cleaning the surface after use is just a matter of wiping it off with a cloth.

The temperature of the cooking surface is controlled with a microprocessor based, proportional controller with a thermocouple sensor in the steam generating boiler. Thus, the temperature can be maintained within one degree of the set point at any loading condition. Because of the extremely accurate temperature control, no part of the griddle surface ever heats hotter than the set point and thus food products placed thereon never smokes or burns. Applicants have further discovered that a grilling surface comprising a plurality of parallel-spaced apart tubular members having the same high temperature and pressure steam passing therethrough can serve to grill food items with the same efficiency as the griddle surface. A stick resistant coating would also be applied to the tubular member.

In addition, the present invention employs a novel steam-jet system that cooks food items placed on either the steam heated griddle or grill surface in approximately one-half the time and with one-half the food shrinkage found with cooking on conventional griddles. The system comprises the use of a separate low pressure boiler or steam generator connected to steam ports in the griddle surface or adjacent the grilling surface. Food products placed on the griddle or grill are covered with an enclosure and steam is injected beneath the enclosure and around the food product. The food products are thus heated on the bottom by contact with the griddle or grill surface and on the top and sides by contact with live saturated steam. This cooking method eliminates the evaporation of water from the food and reduces the time required for cooking. The food is more tender and juicy and has a higher yield than food cooked on conventional griddles or grills.

It is therefore the primary object of the present invention to provide a novel griddle and grill cooking apparatus utilizing steam heat.

It is another object of the present invention to provide a griddle and grill that is capable of cooking food items simultaneously by both conduction and saturated steam.

It is yet another object of the present invention to provide a griddle-type cooking surface whose temperature is substantially uniform at any location on its surface.

It is a further object of the present invention to provide a griddle having a novel metal cooking surface with a cast-in steam carrying tubular passageway.

Other objects and advantages of the present invention will become apparent and obvious from a study of the following description and accompanying drawings, which are merely illustrative of the present invention.

BRIEF DESCRIPTION OF THE DRAWINGS

FIG. 1 is a front elevational view of the steam heated griddle and grill of the present invention;

FIG. 2 is a plan view of the griddle/grill with part broken away;

FIG. 3 is a cross-sectional view taken along lines 3—3 of FIG. 2;

DETAILED DESCRIPTION OF THE INVENTION

Figure 4:
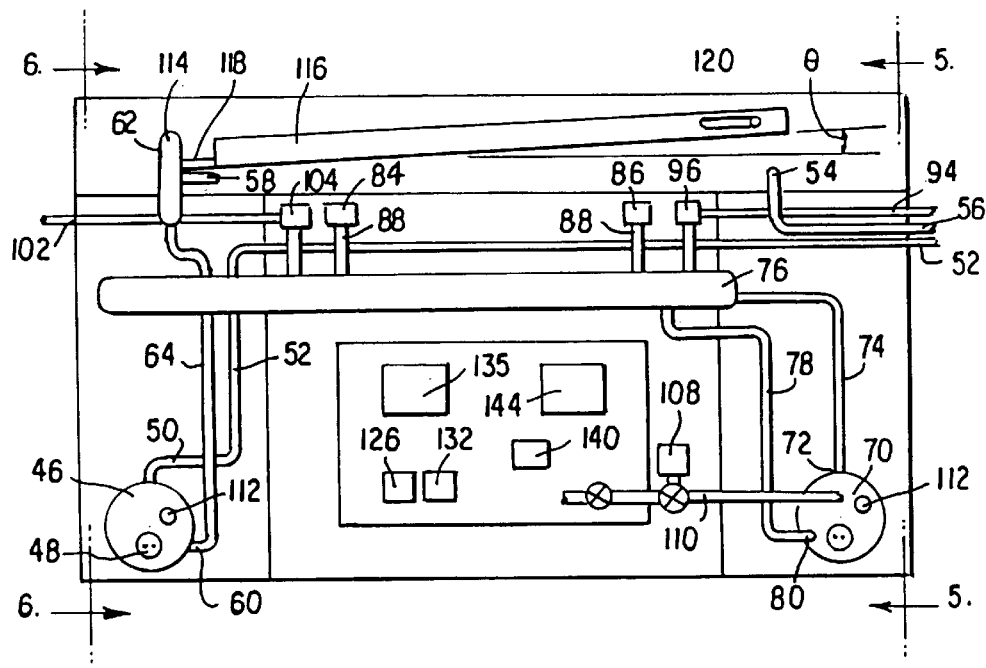
FIG. 4 is a rear elevational view of the griddle/grill.
Figures 5, 6:
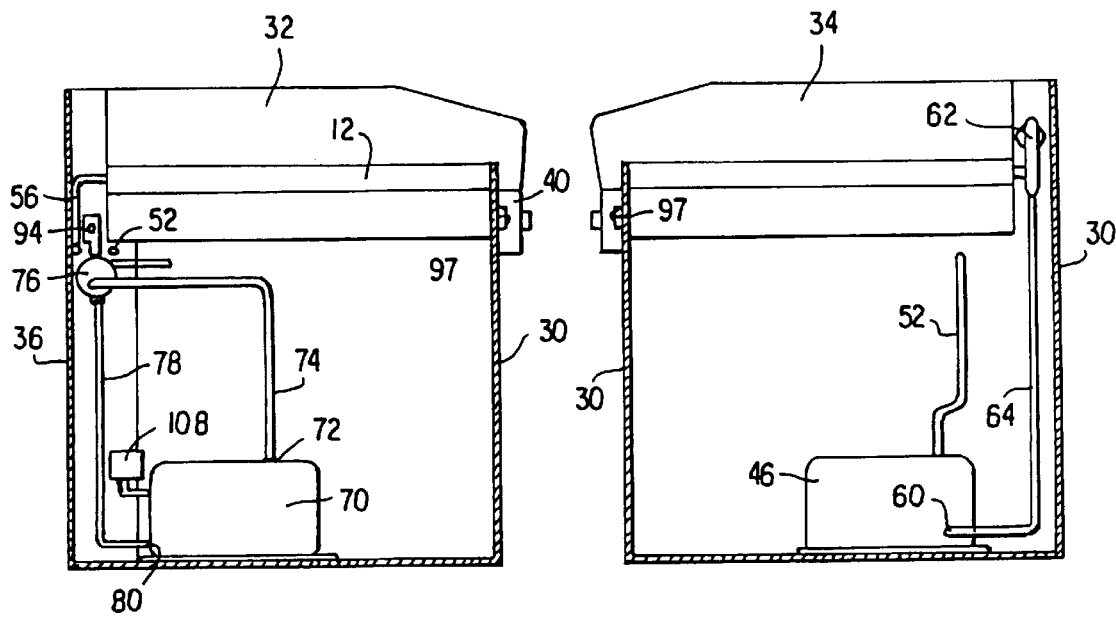
FIG. 5 is a cross-sectional view taken along the lines 5—5 of FIG. 4.
FIG. 6 is a cross-sectional view taken along the lines 6—6 of FIG. 4.
Figure 7:
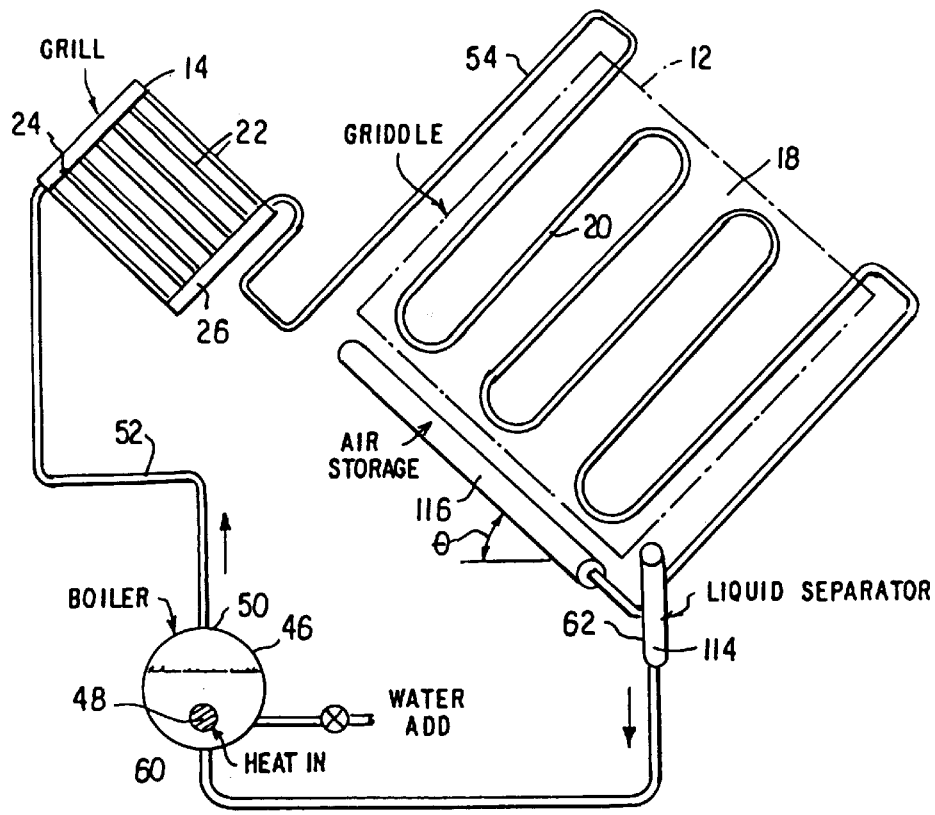
FIG. 7 is a pictorial representation of the high steam pressure system used in the griddle/grill of the present invention.
Figure 8:
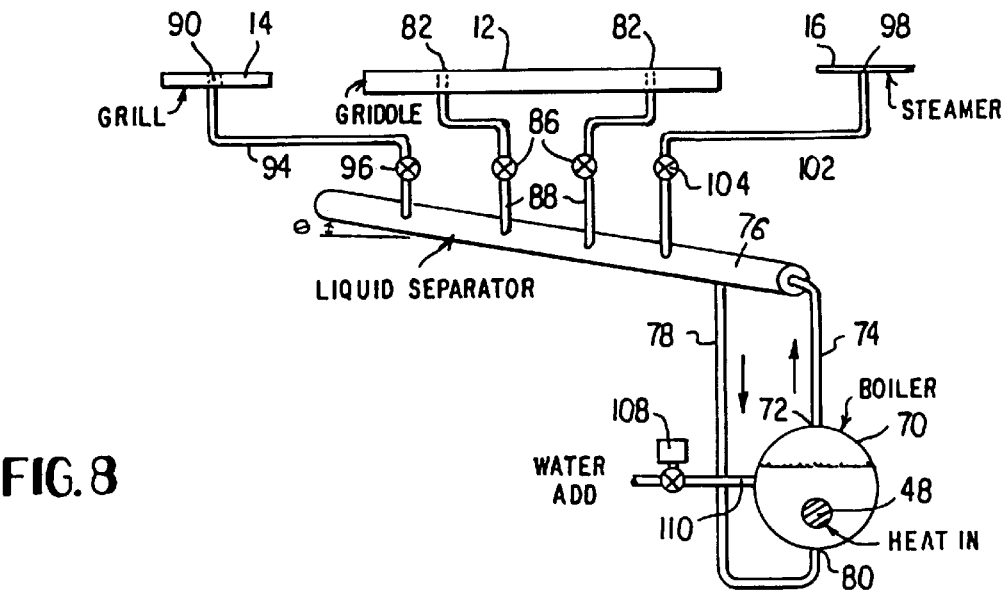
FIG. 8 is a pictorial representation of the low steam pressure system used in the griddle/grill of the present invention.

Referring now to the drawings where like characters of reference indicate like elements in each of the several views, numeral 10 in FIG. 1 refers generally to the cooking apparatus of the present invention having a griddle section 12 with team assist, a grilling section 14 with steam assist and a steamer section 16.

The griddle section 12 shown also in FIGS. 2 and 3 comprises a flat upper cooking surface 18 consisting of a solid slab of aluminum approximately 1 inch thick which is cast around a serpentine shaped length of tubing 20. The tubing 20 is preferably made of stainless steel but can be of other metals as well. Forming the grilling surface 18 by casting the metal about the tubing 20 results in extremely high heat conductivity between the outside surface of the tubing and the cast aluminum. Thus, heat from a heat transfer fluid such as steam flowing in the passageway in tubing 20 is transformed substantially in total to the slab of aluminum. The flat upper cooking surface 18 of the griddle 12 is further coated or has a layer of material thereon to provide a cooking surface 18 that is resistant to food sticking thereto during the cooking process.

A grilling section 14 is also provided adjacent to the griddle section 12 and it comprises a plurality of spaced-apart small diameter (approximately ½") tubular members 22 having the ends thereof connected to and in communication with respective header members 24, 26. Thus, heat from a heat transfer fluid such as steam entering header 24 would pass through all the tubular members 22 to heat same before exiting into header 26. The tubular member 22 and header members 24, 26 are also covered on the outside surface thereof with a stick resistant material as described above with respect do griddle upper cooking surface 18. The griddle, grilling and steam only sections 12, 14 and 16, respectively, are preferably mounted on a cabinet member having a front wall 30, side walls 32, 34 and a rear wall 36. The griddle section 12 is mounted between the side walls 32, 34 and adjacent rear wall 36. The grilling section 14 is mounted on the side wall 32 to one side of the griddle section 12 and the steamer section 16 is mounted on the side wall 34 at the other side of the griddle section 12. The grilling section 14 and steamer section 16 could obviously be mounted anywhere with respect to the griddle section 12 that is convenient for the type of cooking being contemplated. Access doors 38 to a storage area beneath the griddle section 12 are also provided as is a removable bin 40 which serves to collect food product which may be scraped from the cooking surface 18 and deposited in the bin 40 via recess 42 formed in a gutter 44 adjacent the front edge of the cooking surface 18.

The cooking surface 18 of the griddle section 12 and the tubular members 22 of the grilling section 14 are heated by high temperature steam flowing through tubing 20 and header members 24, 26 connecting the ends of tubular members 22 at a relatively high pressure. The steam temperature can be controlled and held precisely at any preselected temperature by means more fully described later, at typically between 350–360° Fahrenheit and at a typical pressure of approximately 150 pounds per square inch. This high pressure steam is generated in a boiler 46 heated by an electrical resistance heater 48. Gas or other heat source could also be used as long as it can be precisely controlled. The boiler 46 has an outlet 50 which is connected to header 24 by means of piping 52. The header 26 is connected to the inlet 54 of tubing 20 of griddle cooking surface 18 by means of piping 56 and the outlet 58 of tubing 20 is connected to the boiler inlet 60 via liquid separator 62 (the function of which will be described later) by means of piping 64. As can thus be seen, the steam from boiler flows in a series path first through grilling section 14 and then through griddle section 12 and back to the boiler 46. As aforestated, applicants have discovered that circulating steam at a relatively high temperature and pressure to heat the griddle cooking surface 18 results in a cooking surface that is the same temperature across its entire area within one or two degrees Fahrenheit of its set point in contrast to conventional gas fired griddles whose surface temperature can very as much as 70–80 degrees Fahrenheit from one area to another.

The function of liquid separator 62 will now be described. After the boiler 46 is energized and resistance element of heater 48 heats the water converting it to steam at a temperature of approximately 350 degrees Fahrenheit (or any other temperature set) and a pressure of approximately 150 pounds per square inch, the steam first enters grilling section 14 and from there passes into and through griddle section 12 pushing any air in the system out outlet 58. Applicants use a serpentine configuration for tubing 20 in griddle section 12 rather than the header and tubular configuration 22, 24, 26 employed in grill section 14 to enable any air in tubing 20 to be completely pushed out to outlet 58 and precluding any air remaining as could possibly be the case in tubular members 22. Any air remaining in tubular member 20 would result in an uneven heating of the cooking surface 18.

The air, condensate, and steam mixture exiting outlet 58 is fed to vertically extending tank 114. In tank 114, steam is separated from the condensate and the condensate returns to boiler 46. However, the air and steam mixture remaining in tank 114 is caused to travel into air storage tank 116 connected thereto via a pipe 118 where it is trapped. The steam condenses out in tank 116 and also returns to boiler 46. Air can enter the system through small leaks as there is a high vacuum created in the system when it is shut down and the steam condenses. This air must be kept from reentering the system when it is once again started up. Thus, the air trapped in tank 116 remains in it and does not reenter the system. The separator 62 and associated tanks 114 and 116 thus function to separate any air from the system and enable it to operate on pure steam only even after repeated on and off cycling of the boiler 46. Thus, air does not repeatedly have to be purged from the system after each cycle (on-off). In addition, pipe 118 connecting tank 116 with tank 114 must be connected to tank 114 at a location to permit any condensate forming in tank 114 to run out and return to the boiler 46 via piping 64. Tank 116 is also positioned at a slight angle 0 with respect to the horizontal to facilitate this drainage of condensate therefrom.

In addition to the aforedescribed griddle and grilling sections 12, 14, respectively, wherein food products can be cooked by conduction heat when the product comes in direct contact with the heated cooking surface 18 and tubular grilling members 22, the present cooking apparatus 10 includes a unique method and device for simultaneously cooking the aforementioned food products also by convection. Such convection cooking is achieved by surrounding the food product being cooked on the cooking surface 18 or tubular members 22 with live, saturated steam injected beneath a cover 106 placed over the cooking food product.

The live, saturated steam is generated by a second low pressure boiler 70 having an outlet 72 connected by piping 74 to a length of larger diameter tubing 76 that serves as a separation chamber. The chamber 76 is also mounted at a slight angle 0 with respect to the horizontal to permit any condensate formed therein to return to the boiler 70 via piping 78 and inlet 80. A plurality of vent holes 82 are provided through the cooking surface 18 and connected via hand operated valves 84, 86 to the separation chamber 76 by piping 88. In addition, a vent hole 90 is provided in a pan 92 beneath tubular members 22 of grilling section 14. The vent hole 90 is connected to the separation chamber 76 by piping 94 via a hand operated valve 96. Further, a vent hole 98 is also provided in a pan 100 provided beneath a food support grid 101 steamer section 16. The vent hole 98 is connected to the separation chamber 76 by piping 102 via a hand operated valve 104. Operation of the valves 84, 86, 96 and 104 by control knobs 97 can send saturated steam to vent holes 82, 90 and 98, respectively. The cover 106, as aforementioned, is provided to be placed over the food items being simultaneously cooked by both steam from a vent and conduction from the heated cooking surface 18, 22. The cover 106 can take many other forms (not shown for simplicity) such as a glass doored enclosure over cooking surface 22 or horizontally slidable or foldable glass panels mounted above cooking surface 18.

A float controlled solenoid valve 108 is also provided in line 110 to replenish water in boiler 70 as it is converted into steam and discharged through the vents. Each boiler 46, 70 is equipped with a sight glass 112 to enable the operator to visually determine the water level in the respective boilers.

Figure 9:
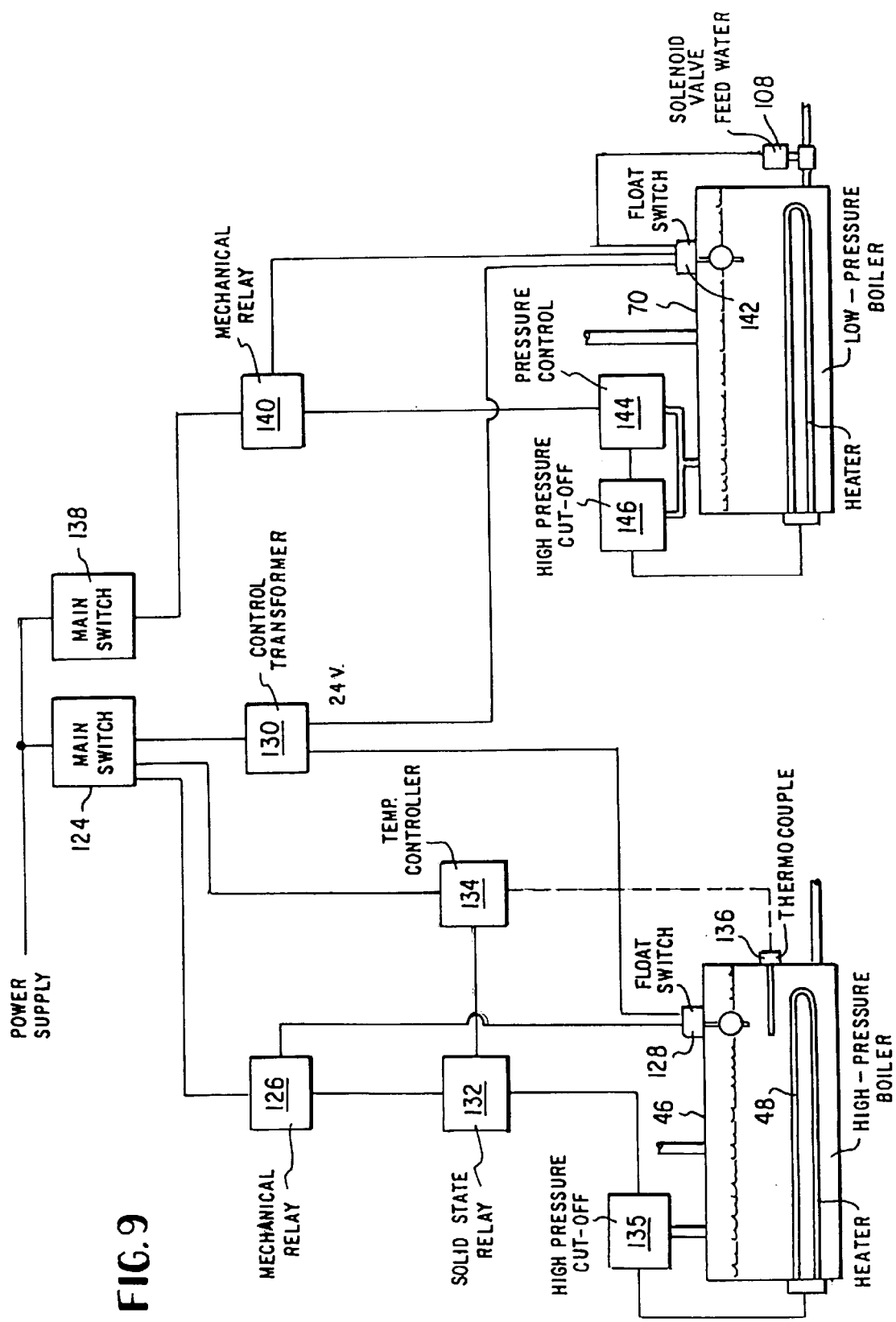
FIG. 9 is a block diagram of the electrical control system of the present invention.

Referring now to FIG. 9 a block diagram of the various electrical components and their interconnection is shown wherein power from a source of electrical current is fed to a first main switch 124 for controlling high pressure boiler 46. Electrical current from main switch 124 is fed to a mechanical relay 126. This relay 126 is controlled by a float switch 128 which gets its electrical current from a control transformer 130. In the event that water in the boiler would get too low and possibly expose the boiler heater element 48, the float switch 128 would shut off the mechanical relay 126 and thus stop power going to the boiler heater element 48. The mechanical relay 126 feeds electrical current to a solid-state relay 132 which, in turn, is controlled by a temperature controller 134. The temperature controller gets its electrical current from the main switch 124 and senses the temperature in the boiler 46 by means of a thermocouple 136 inserted in the boiler water. The temperature controller 134 sends a pulsating proportional electrical signal to the solid state relay 132 to thereby control the temperature of the water in the boiler 46. Electrical current form the solid state relay 132 is fed to the heater element 48 via a high pressure cut-off switch 135 to thereby terminate electrical current to the heater element 48 in the event pressure in boiler 46 exceeds a preset pressure.

The components and their interconnection for the low pressure boiler 70 include a second main switch 138 for feeding electrical current from a source to a mechanical relay 140 which, in turn, is controlled by a float switch 142 in the same manner as the high pressure system aforementioned. The float switch 142, however, has two sets of contacts (not shown) for sensing different water levels in the boiler 70. The higher level contacts (not shown) control electrical current to the solenoid 108 to introduce feed water from a source into boiler 70 to replenish that water lost in the form of steam vented through vent holes 82, 90, 98 and to maintain water at a certain level. The lower level contacts (not shown) control electric current to the mechanical relay 140 to thereby shut off power to the heater element 48 if the water level in the boiler should get too low. Electrical current from the mechanical relay 140 is fed first to a pressure control 144 which controls the pressure in the boiler 70 and then through a high pressure safety cut off switch 146 for controlling electrical current to the heater element 48 in the event the pressure in boiler 70 gets too high.

Applicants have thus disclosed and described in detail their novel steam heated griddle and grill which can simultaneously cook food items by introducing steam into the interior of an enclosure covering food items placed on the griddle and grill.

It should be understood that changes and modifications in the form, construction, arrangement, and combination of the several parts of the steam heated griddle and grill may be made and substituted for those herein shown and described without departing from the nature and principle of our invention.

We claim:

1. An apparatus for cooking food items comprising:
   a) a griddle means having a base with a flat upper surface for supporting food items placed thereon, said griddle means having a chamber adjacent said surface,
   b) system means for supplying steam at a controlled temperature to said chamber for heating said upper surface to thereby cook said food items placed thereon,
   c) cover means adapted to be placed over food items being cooked on said support surface, and
   d) means for injecting steam inside of said cover and around said food items to aid in the cooking of said food items simultaneously being cooked by said steam heated support surface.

2. An apparatus as set forth in claim 1 wherein said means for injecting steam is an aperture through said griddle means, said aperture being connected to a controlled source of low pressure steam.

3. An apparatus for cooking food items comprising:
   a) griddle means having a base with a flat upper surface for supporting food items placed thereon, said griddle means having a chamber adjacent said surface,
   b) boiler means for generating steam under pressure connected to said chamber to form a closed circulation loop from said boiler, through said chamber and back to said boiler,
   c) means for controlling the temperature of said steam leaving said boiler, and
   d) means for separating liquid condensate from air in said system and means for storing said air.

4. An apparatus for cooking food items comprising:
   a) griddle means having a base with a flat upper surface for supporting food items placed thereon, said griddle means having a chamber adjacent said surface,
   b) system means for supplying steam at a controlled temperature to said chamber for heating said upper surface to thereby cook said food items, and
   c) grill means adjacent said griddle means for grilling food items placed thereon, said grill means being heated by said steam supplied by said system means and said grill means is comprised of a plurality of spaced-apart tubular members, each tubular member having one end thereof connected to a first plenum and the other end thereof connected to a second plenum.

5. An apparatus as set forth in claim 4 wherein said tubular members and said first and second plenums are covered by a stick resistant coating.

6. An apparatus for cooking food items comprising:
   a) griddle means having a base with a flat upper surface for supporting food items placed thereon, said griddle means having a chamber adjacent said surface,
   b) system means for supplying steam at a controlled temperature to said chamber for heating said upper surface to thereby cook said food items placed thereon,
   c) grill means adjacent said griddle means for grilling food items placed thereon, said grill means being heated by said steam supplied by said system means,
   d) cover means adapted to be placed over said food items being grilled, and
   e) means for injecting steam inside of said cover and around said food items to aid in cooking said food items that are simultaneously being grilled.

7. An apparatus for cooking food items comprising:
   a) griddle means having a base with a flat upper surface for supporting food items placed thereon, said griddle means having a chamber adjacent said surface,
   b) system means for supplying steam at a controlled temperature to said chamber for heating said upper to thereby cook said food items placed thereon,
   c) steamer means adjacent said griddle means having a rack for supporting food items to be cooked,
   d) cover means adapted to be placed over said rack, and
   e) means for injecting steam inside of said cover to thereby cook said food items.

8. An apparatus for cooking food items comprising:
   a) griddle means having a base with a flat upper surface for supporting food items placed thereon, said griddle means having a chamber adjacent said surface, b) system means for supplying steam at a controlled temperature to said chamber for heating said upper surface to thereby cook said food items placed thereon, and c) means for separating liquid condensate from air in said system.

9. An apparatus for cooking food items comprising:

a) griddle means having a base with a flat upper surface for supporting food items placed thereon, said base having a continuous passageway formed therein, b) grill means adjacent said griddle means for grilling food items placed thereon, said grill means comprising a plurality of spaced-apart tubular members, and c) boiler means for supplying steam at a controlled temperature to said passageway and said tubular members for heating said upper surface and said tubular members to thereby cook said food items placed thereon.

10. An apparatus for cooking food items comprising:

a) a conduction heated griddle having a flat solid upper support surface for supporting food items to be cooked thereon, b) a steam generator for supplying steam at a controlled temperature, c) an enclosure adapted to be placed over the food items and at least partially on the heated griddle, and d) at least one piping for supplying steam from the steam generator to inside of the enclosure and around the food items so as to aid in the cooking of the food items simultaneously with the food items being cooked by the heated griddle.

11. The apparatus of claim 10, wherein the steam generator is a low pressure steam generator.

12. The apparatus of claim 11, wherein the steam generator generates saturated steam.

13. The apparatus of claim 10, wherein the support surface has food sticking resistant material thereon.

14. The apparatus of claim 10, wherein a chamber mounted at an angle with respect to the horizontal is disposed in the piping for returning steam condensate to the steam generator.

15. The apparatus of claim 10, wherein there is a plurality of pipings.

16. The apparatus of claim 10, wherein a steam control valve controls the flow of steam in the piping.

17. The apparatus of claim 10, wherein there is a control valve for replenishing water in the steam generator.

18. The apparatus of claim 10, wherein the steam generator is an electrically powered generator.

19. The apparatus of claim 18, wherein the steam generator has sensors for sensing the water level in the steam generator.

20. The apparatus of claim 18, wherein the sensors control a valve to introduce water into the steam generator and control a relay to shut off electrical power to the generator.

* * * * *